INVENTORS
Hans Ebert
Kurt Giesswein
Ernest Harmsen &
Heinz Vomberg
BY Connolly and Hutz
ATTORNEYS July 27, 1965  H. EBERT ETAL  3,196,930
PROCESS FOR PRODUCING DRY MAGNESIUM CHLORIDE
FROM SOLUTION CONTAINING IT
Filed Sept. 27, 1960  5 Sheets-Sheet 4
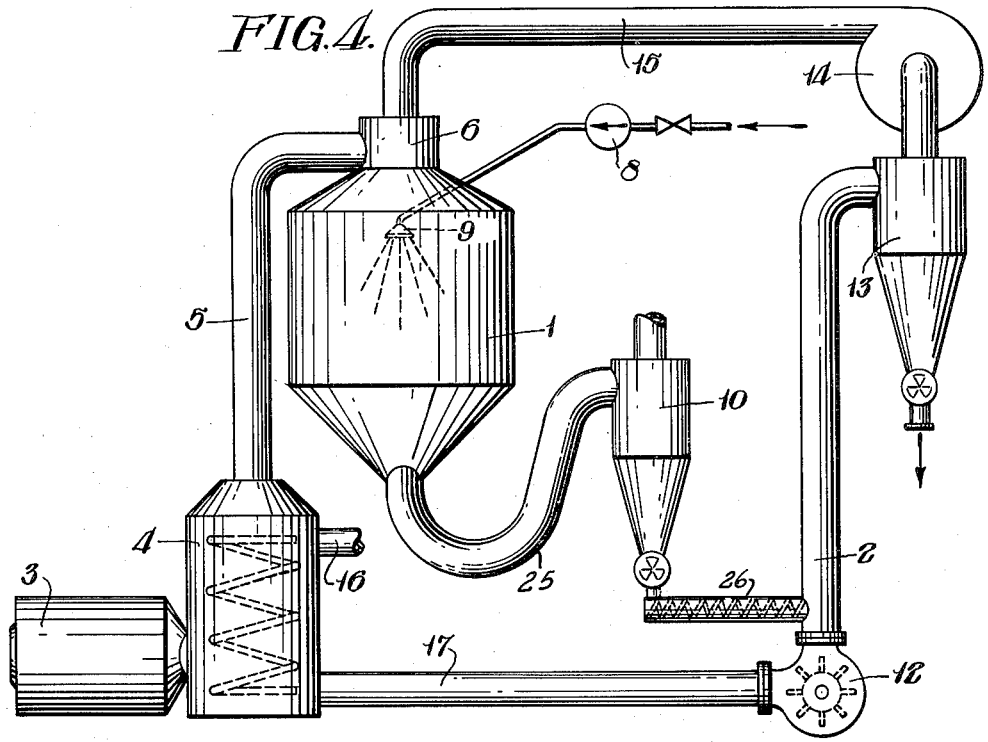
FIG.4.
FIG.6.
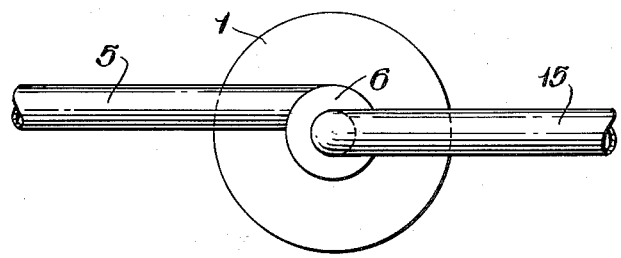
INVENTORS
Hans Ebert
Kurt Giesswein
Ernst Harmsen
Heinz Vomberg
BY Connolly and Hutz
ATTORNEYS

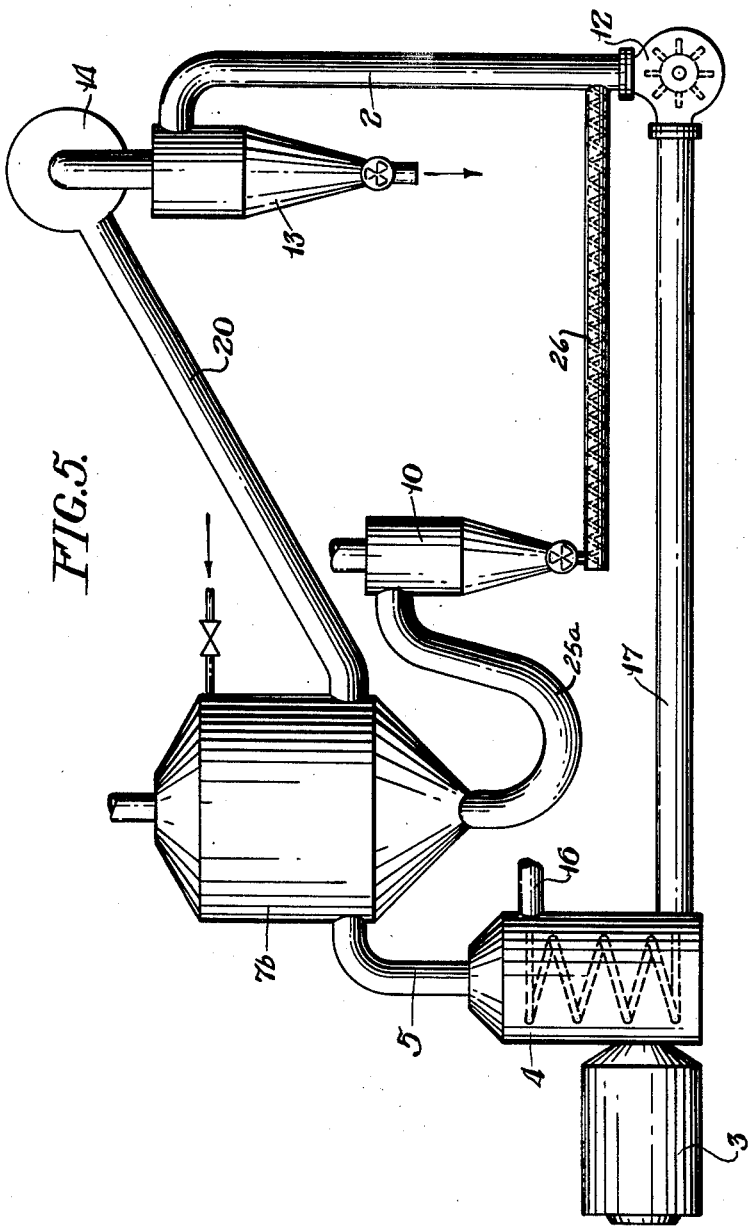

United States Patent Office 3,196,930
Patented July 27, 1965

3,196,930
PROCESS FOR PRODUCING DRY MAGNESIUM CHLORIDE FROM SOLUTIONS CONTAINING IT
Hans Ebert, Knapsack, near Cologne, Kurt Giesswein, Krefeld-Bockum, Ernst Harmsen, Bruhl, near Cologne, and Heinz Vomberg, Kottingen, near Cologne, Germany, assignors to Knapsack-Griesheim Aktiengesellschaft, Knapsack, near Cologne, Germany, a corporation of Germany
Filed Sept. 27, 1960, Ser. No. 58,816
Claims priority, application Germany, Oct. 2, 1959, K 38,820
5 Claims. (Cl. 159—48)

The present invention relates to a process and apparatus for the production of magnesium chloride substantially free from water and oxide from aqueous solutions containing magnesium.

It is known that solutions containing magnesium chloride which are obtained in bulk quantities in the potash industry, can be evaporated and subsequently dried to be converted into industrially useful magnesium chloride. Magnesium chloride for use in metallurgy should be free from water and oxide. These magnesium chloride solutions are very difficult to dry for the following reasons: the temperature gradient which can technically be used below the melting points of the various hydrate stages is very small and in order to obtain substantially anhydrous magnesium chloride and avoid hydrolysis, the drying plant must be so operated that the drying agent used is removed from the drying plant at a low degree of saturation and high temperature.

In other words, so much heat is required for drying that the economy of the process is considerably impaired. This is the reason why producing magnesium chloride from the end lyes obtained in potash industry did not gain practical interest. The lye is delivered to rivers and waters contrary to all endeavours made of keeping them clean.

In a customary process, solutions containing magnesium chloride are dried in an atomizing drier at a hot gas inlet temperature of 400° C. The issuing gases have a temperature of 200° C. In other words, the heat can only be utilized to a small extent. Furthermore, the dried product still contains a relatively large proportion of water.

The present invention provides a process for drying solutions containing magnesium chloride in multi stages. In accordance with the invention, the starting solution is pre-dried in a spray drier and/or a contact drier and drying is then continued in a flow drier, the gas issuing from the flow drier being maintained at a temperature which, measured in degrees centigrade, is at most 40%, advantageously 15–30%, below its inlet temperature, and used for heating the spray drier and/or contact drier charged with fresh solution.

According to a further embodiment of the invention, the gas issuing from the spray drier is passed through the contact drier charged with fresh solution. In this manner, the heat energy of the gas is better utilized and finest particles of product contained in it are separated.

As drying agent hot gas or warm air produced in a heat exchanger may be used. Attempts have shown that it is advantageous in the last drying stage to replace hot gas by warm air which contains less moisture, whereby the danger of hydrolysis is diminished and the product is better dried so that magnesium chloride substantially free from oxide and water is obtained. Residual water and oxide still included in magnesium chloride can be removed in a subsequent separate operation.

An apparatus suitable for use in carrying out the process of this invention is shown diagrammatically in the accompanying drawing, wherein FIG. 1 is a view of a multi-stage drier in which hot gas and warm air are used and wherein the air issuing from the last stage is returned entirely to one of the prior stages.

FIG. 4 is a view of a two stage drier assembly.

FIG. 5 is a modification of the two stage drier assembly of FIG. 4.

FIG. 6 is a top detailed view of the spray drier used in the drier assemblies of the above figures.

In the figures of the drawings the same reference numerals designate the same parts. When the numeral is followed by a letter this means that it is a structural modification of the initially designated part in a previous figure but that it accomplishes the same function.

Figure 1:
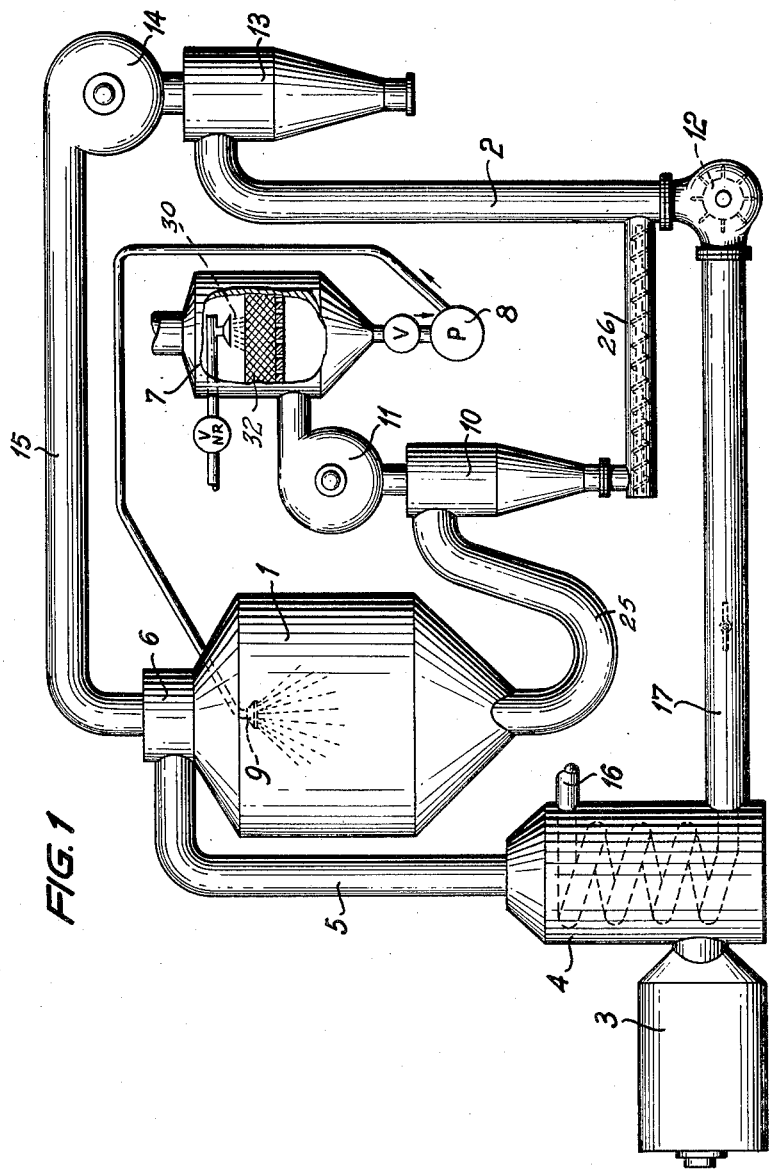

In FIG. 1, reference numeral 1 represents a spray drier, 2 is a flow drier and 3 is a heating means. The hot gases produced in the heating means at a temperature of about 800° C. are first passed through a heat exchanger 4. The gases issuing from the heat exchanger, for example at a temperature of 550° C., flow through pipe 5 and are introduced tangentially into head 6 of the spray drier (see FIG. 6). Reference numeral 7 represents a contact drier. A contact drier is illustrated with center liquid inlet opening 30 disposed in one plane and filling layer or insertions 32. The solution evaporated in contact drier 7 is conveyed via pump 8 to atomizer 9 and atomized into finest droplets. In the spray drier, the bulk of water is evaporated so that substantially dry fine-grained product is obtained. The fine-grained product is transferred through conduit 25 to separator 10. Ventilator 11 forces the gases issuing from the spray drier, for example at a temperature of 150° C., through contact drier 7 which is a so-called direct evaporator of customary type to contact the issuing gas directly with the solution. In this manner, the heat energy included in the issuing gas is fairly well utilized whereby the gas is cooled, for example to a temperature below 100° C. Finest product particles contained in the issuing gas are simultaneously absorbed by the solution so that expensive dust removal means can be omitted.

The product substantially pre dried, for example to a residual moisture content of 15–25%, is conveyed through conduit 26 from separator 10 to flow drier 2 which is provided with a rapidly rotating centrifuge 12 to centrifuge from below to above any materials fallen through. The end section of the flow drier carries material separating device 13 and ventilator 14 with pipe 15 conveying the air issuing from the flow drier to the spray drier.

Preferably, the flow drier is heated with warm air. Short pipe 16 of the heat exchanger serves to suck in fairly dry environmental air which is heated in the heat exchanger, for example to 450° C., and flows via pipe 17 into flow drier 2.

The air issuing from the flow drier should have a temperature of at least 270° C. as it shall be at most 40% lower than the inlet temperature. It is, however, advantageous to operate the flow drier with issuing air having a still higher temperature, for example about 300° C. In this case, the air issuing from the flow drier is only slightly saturated. It can then be used without difficulty in the spray drier so that the flow drier works substantially without loss of issuing air. The above process is a very important one from an economical point of view. Notwithstanding that warm air is removed from the flow drier at a low degree of saturation and high temperature, the temperature gradient used in this example ranges from about 450° C. (mixing temperature of air issuing from heat exchanger 4 with gases issuing from the flow drier) to less than 100° C. (temperature of air issuing from the contact drier and/or spray drier).

In comparison with this, the principle of all drying processes known up to now was always choosing the conditions in the driers in such a way that the discharged gases from the driers have low temperatures and a water content as high as possible. Yet surprisingly, it turned out that by operating our flow drier under these conditions (being exceptional for driers) a hydrolysis of the magnesium chloride (accumulating generally in the first step already in crystalline form yet still charged with water of crystallization) is avoided. This, because the end product in the decisive phase of drying (in the transformation from the form containing water of crystallization to the solid form free of water of crystallization) comes in contact with gases which contain water vapor only to a small extent. For this reason, the flow drier is not operated by combustion gases, as it is generally customary, but with warm air produced in a heat exchanger. Although the drying capacity of the gases in the flow drier is utilized only for a fraction, the process nevertheless is extremely economic because the discharged gases of the second step are used further and utilized for heating the contact drier and/or spray drier.

Figure 2:
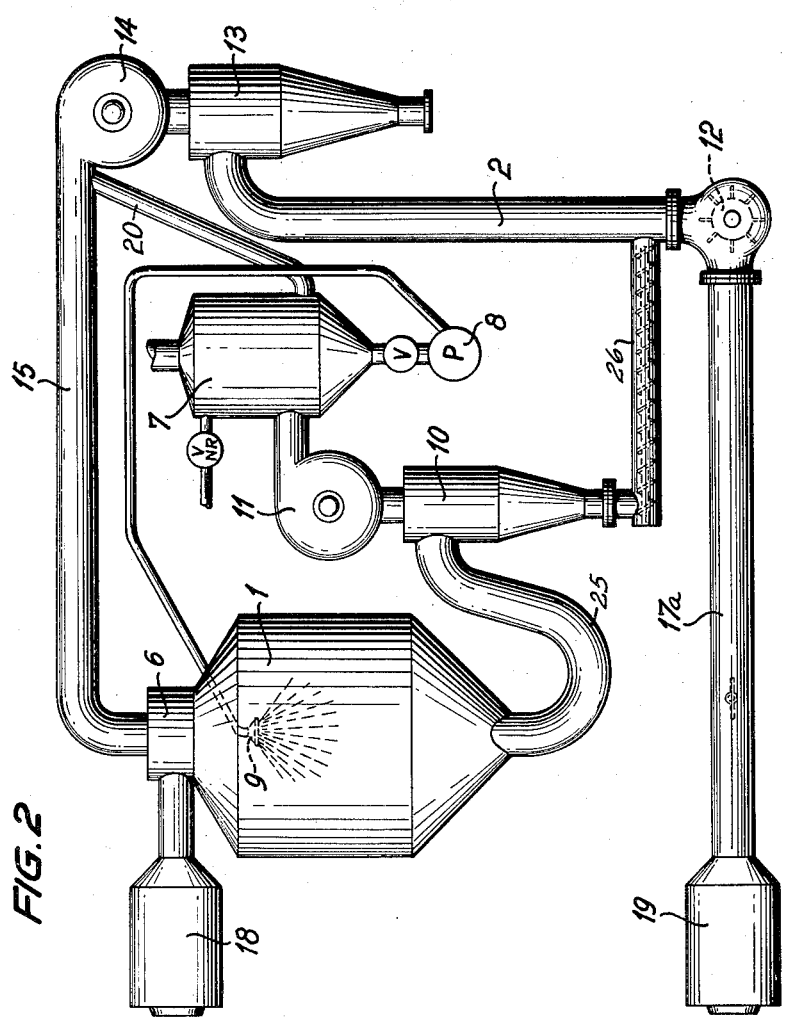
FIG. 2 is a view of a multi-stage drier in which only hot gas is used in the drying stages and wherein the gas issuing from the last drying stage is returned to two prior stages.

In the embodiment shown in FIG. 2 the spray drier and flow drier are provided with separate heating means 18 and 19 producing hot gases. All other parts of the apparatus are identical with those shown in FIG. 1 except that branch pipe 20 extends between pipe 15 and contact drier 7 as shown whereby portions of the heated gas issuing from the flow drier are returned to both the spray drier and the contact drier 7.

Figure 3:
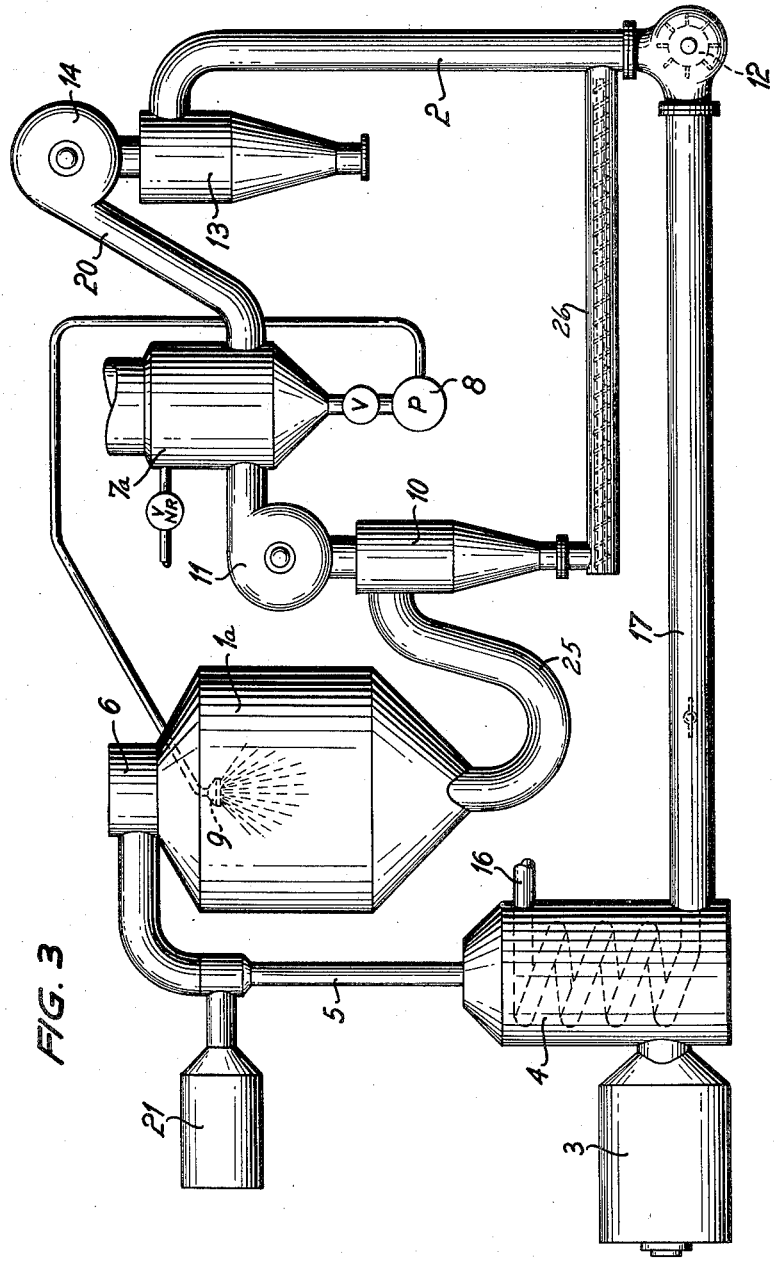
FIG. 3 is a view of a multi-stage drier in which gas and air are used and the air issuing from the last drying stage is returned entirely to a different stage than to that one referred to in FIG. 1.

In FIG. 3 the air issuing from the flow drier is conveyed through pipe 20 to contact drier 7a. No air is returned from this point to the spray drier 1a. In this embodiment the spray drier is series-connected to an additional heating means 21 which is intended to produce additional gas unless the gases issuing from heat exchanger 4 are available to the extent necessary or have the desired temperature.

The drying assembly of FIG. 4 is similar to that of FIG. 1 except that the contact drier 7 is omitted and the solution to be dried is initially and directly passed to the spray drier 1.

The drying assembly of FIG. 5 is similar to that of FIG. 3, except that spray drier 1 is omitted and the solution to be dried is initially and directly passed into the contact drier 7b.

FIG. 6 is a top view of the spray drier 1 with connecting pipes 5 and 15 passing thereinto as shown, pipe 5 projects tangentially into head 6 of the spray drier 1.

Attempts have shown that substantially dry magnesium chloride is obtained at the above temperatures without noteworthy hydrolysis taking place.

It is emphasized that the use of a short time drier (flow drier) is obligatory in the last drying stage as prolonged drying periods involve decomposition phenomena.

Connecting spray drier and flow drier in series involves the advantage that fine-grained product is obtained in the spray drier. By subsequent short-time treatment, which is characteristic of flow drying, the material so obtained is substantially freed from residual water without substantial hydrolysis taking place.

We claim:
1. A process for the production of a magnesium chloride-containing salt mixture substantially free of water and oxide from an aqueous magnesium chloride-containing solution which comprises a first evaporating step of evaporating substantially all water from the magnesium chloride-containing solution to form a substantially dry, fine-grained product by direct contact heating the solution with a substance selected from the group consisting of heated air and gas, flash flow-drying the substantially dry, fine-grained product to remove the remaining water by contacting said product with heated air in such a manner that not more than a 40 percent temperature decrease in degrees centigrade occurs in the heated air during such contact and not more than a low degree of moisture saturation remains in said heated air to avoid noteworthy hydrolysis of the magnesium chloride and passing the heated air after contact to first evaporating step.

2. The process of claim 1 wherein the first evaporating step is carried out by direct contact heating the solution in a contact drier zone.

3. The process of claim 1 wherein the first evaporating step is carried out by direct contact heating the solution in a spray drier zone.

4. The process according to claim 1 wherein the first evaporating step is carried out in a first and second stage, the first stage being direct contact heating of the solution in a contact drier zone and the second stage being direct contact heating of the solution in a spray drier zone.

5. The process of claim 4 wherein a portion of the heated air after contact in the flash flow drying is passed to the contact drier zone and the remaining portion is passed to the spray drier zone.

References Cited by the Examiner

UNITED STATES PATENTS

| | | | |
|---|---|---|---|
| 1,497,201 | 6/24 | Wheat | 159—48 |
| 1,933,254 | 10/33 | Goodell. | |
| 1,933,255 | 10/33 | Goodell. | |
| 2,118,272 | 5/38 | Smith. | |
| 2,277,827 | 3/42 | Heath et al. | 159—48 X |
| 2,290,470 | 7/42 | Hall. | |
| 2,312,474 | 3/43 | Peelles | 159—48 |
| 2,361,940 | 11/44 | Hall. | |
| 2,367,770 | 1/45 | Hall. | |
| 2,400,459 | 5/46 | Hall. | |
| 2,460,546 | 2/49 | Stephanoff. | |
| 2,670,036 | 2/54 | Spalding | 159—4 |
| 2,839,122 | 6/58 | Laguilharre. | |

NORMAN YUDKOFF, *Primary Examiner.*

GEORGE D. MITCHELL, CHARLES O'CONNELL, BENJAMIN BENDETT, *Examiners.*